United States Patent Office 3,101,082
Patented Aug. 20, 1963

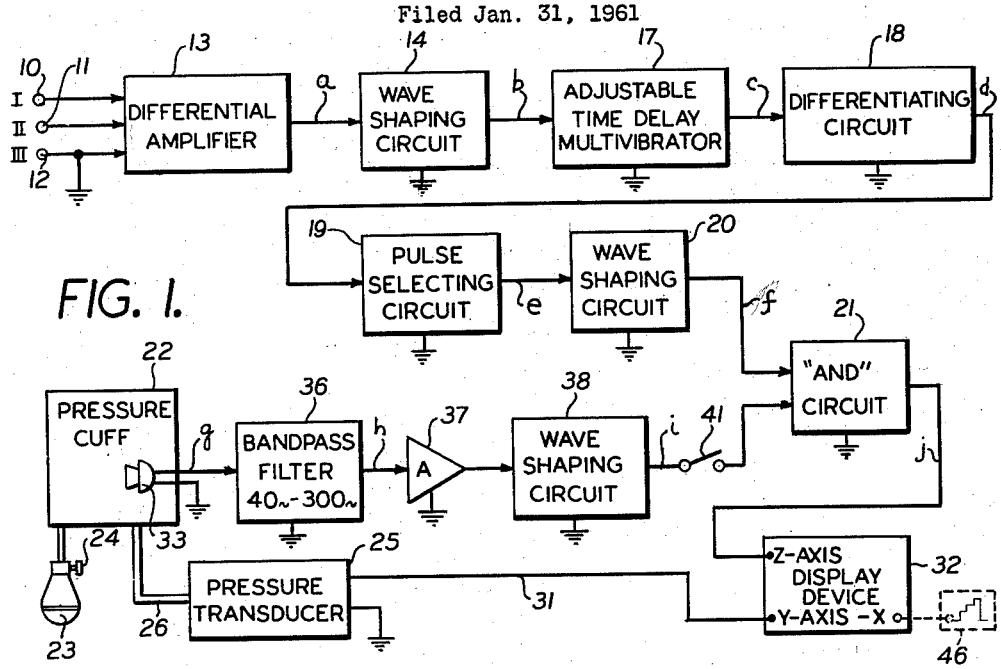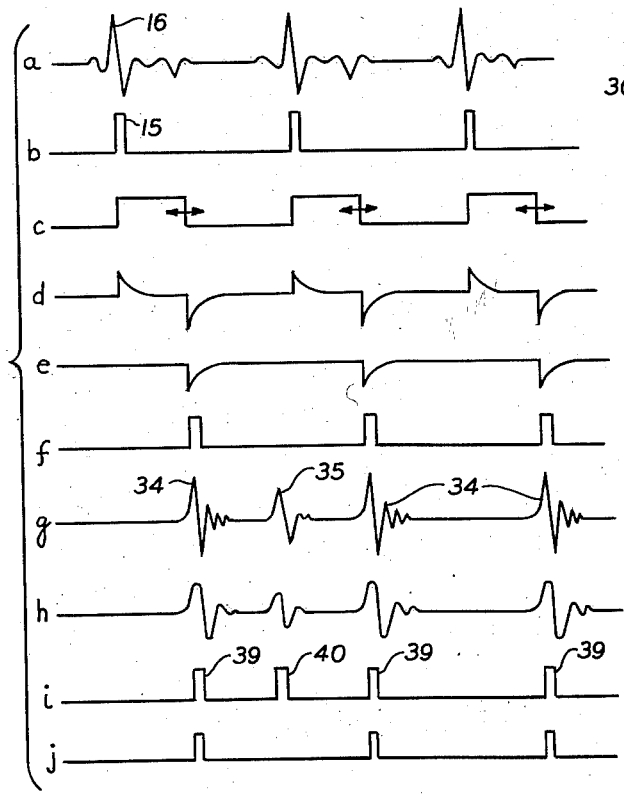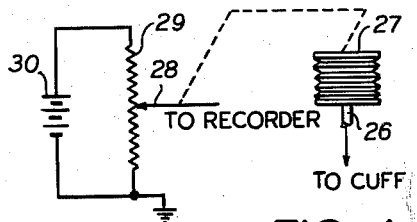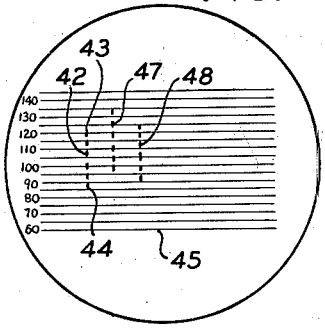
Aug. 20, 1963 S. N. STEEN ETAL 3,101,082
APPARATUS FOR MEASURING SYSTOLIC AND DIASTOLIC BLOOD PRESSURES
Filed Jan. 31, 1961
FIG. 1.
FIG. 3.
FIG. 2.
FIG. 4.
INVENTORS
STEPHEN N. STEEN
FRANK L. GRISSMAN
BY
ATTORNEYS.

3,101,082
APPARATUS FOR MEASURING SYSTOLIC AND DIASTOLIC BLOOD PRESSURES
Stephen N. Steen, New York, N.Y., and Frank L. Grissman, Neptune, N.J., assignors to St. Barnabas Hospital for Chronic Diseases, New York, N.Y., a corporation of New York
Filed Jan. 31, 1961, Ser. No. 86,097
9 Claims. (Cl. 128—2.05)

The present invention relates to a device or apparatus for measuring the systolic and diastolic blood pressures in a human body.

A standard manually operable sphygmomanometer includes a pressure cuff usually placed about the upper arm of an individual and inflated by a squeeze bulb until the brachial artery is occluded. By means of a manually operable valve the pressure in the cuff is slowly reduced until blood commences to pass in spurts under the cuff. This gives rise to a sound bearing a certain relationship to each heart beat which can be heard with the aid of a stethoscope placed adjacent the cuff on the side away from the heart. By reading a manometer connected to the cuff pressure system at the onset of such auscultatory sound, a measurement is obtained of the systolic pressure.

With further lowering of the cuff pressure the sound will be audible until continuous flow occurs throughout the heart cycle at which time the sound will either rapidly diminish in loudness or disappear entirely. A reading of the manometer at this time yields the diastolic pressure.

It should be readily apparent that the so-called standard apparatus and procedure are to a great extent dependent for their accuracy upon the skill and hearing ability of the operator. Movement of the arm or body of the patient or loud noises in the vicinity can interfere with a reading. Furthermore, the procedure is poorly adapted to monitoring the blood pressure of an individual where constantly repeated measurements are required as during an operation or when a patient is in critical condition.

Numerous attempts have been made at producing a reliable automatic sphygmomanometer to replace the manually operable type. However, the various transducers required to replace the eyes and ears of a human operator are even more readily misled by extraneous or undesired signals. Some arrangements have used microphones for detecting auscultatory sounds while other systems have employed pressure transducers for sensing fluctuations in the pressure system of the cuffs. The microphone, however, responds to other body sounds caused by movement or a blow, it is sensitive to external noise and so forth. In similar fashion, fluctuation in cuff pressure is not always caused by the blood pulsing through the artery.

In attempting to eliminate false operation in known automatic equipment, reliance has been placed upon the use of more than one transducer. Unfortunately, heretofore, the parameters selected for monitoring were all subject to simultaneous interference from common extraneous sources. Consequently, no satisfactory equipment is yet commercially available.

A purpose of the present invention is to provide a completely dependable and reliable automatic sphygmomanometer. An entirely new approach to the problem was conceived and adopted. Instead of relying upon one of the parameters normally monitored in the measurement of blood pressure, the present invention makes use of the electrical potentials associated with the contractions of the heart muscles for eliminating artifacts. In other words, the present invention makes use of the very same signals picked up and recorded in electrocardiography.

More specifically the present invention is embodied in a device which comprises, in addition to an inflatable cuff and means for selectably inflating same, an electromechanical auscultatory transducer for monitoring the sounds of arterial flow past the cuff and producing an electrical signal responsive thereto, electrode means for detecting the electrical potentials associated with the contractions of the heart muscles, a comparison circuit coupled to both the electrode means and the auscultatory transducer for producing an output signal only when a signal from the auscultatory transducer occurs a predetermined interval after a signal from the electrode means, and means coupled both to the pressure circuit of the cuff and to the comparison circuit for sampling the cuff pressure and producing a manifestation corresponding thereto in response to reception of the output signal from the comparison circuit.

Automatic inflating equipment can be included in the device as well as a recording type indicator for providing a fully automatic system. If desired, the means for producing a manifestation may be coupled to automatic control equipment for automated performance of any function dependent upon blood pressure conditions. Numerous other uses for the equipment embodying the invention, as well as the many advantages thereof, will become apparent to those skilled in the art after reading the following detailed description of one embodiment thereof with reference to the appended drawings in which:

FIG. 1 is a block circuit diagram of semi-automatic equipment embodying the invention;

FIG. 2 is a fragmentary schematic illustration of a pressure transducer for use in the equipment of FIG. 1.

FIG. 3 is a family of curves showing typical electrical pulse waveforms at various points in the equipment of FIG. 1 for assisting in an explantion of the operation thereof; and FIG. 4 is a diagrammatic representation of a typical display on the face of a cathode ray tube indicator in accordance with an aspect of the invention.

Referring now to FIG. 1 of the drawing, typical electrocardiographic electrodes 10, 11 and 12 are shown coupled to the input of a differential amplifier 13. The differential amplifier is one which rejects signals occuring simultaneously in phase at both terminals 10 and 11 while it passes the desired signals which are generally out of phase. The output of the differential amplifier 13 is represented by the curve $a$ in FIG. 3. This is a typical cardiographic signal.

The sharply peaked signal from the differential amplifier, corresponding to each heartbeat, is fed to a wave shaping circuit 14. This circuit may comprise a D.C. monostable triggered device which switches to its unstable condition when the amplitude of an input signal exceeds a predetermined trigger level and returns to its stable condition when the input signal drops below a predetermined threshold level. The output is in the form of a steep sided square topped pulse as shown by curve $b$ in FIG. 3. As seen in FIG. 3 the pulse 15 coincide in time with the sharp pulse 16 in curve $a$. It is believed that trigger circuits capable of producing the required waveform are well known in the art.

Next, the signal is fed to the input of an adjustable time delay multivibrator 17 whose output is represented by curve $c$ in FIG. 3. This may be a classical type of circuit which switches to its unstable condition coincidently with the leading edge of the input pulses and returns to its stable state a predetermined time later as determined by its time constant. By adjusting the time constant, the occurrence of the trailing edge of the output pulse from multivibrator 17 can be varied.

From the multivibrator 17 the signal is now passed through a differentiating circuit 18 to provide pulses of positive and negative polarity corresponding, respectively, to the leading and trailing edges of the pulses from multivibrator 17. These are illustrated in curve d of FIG. 3.

A pulse selecting circuit 19, which may be simply a unilateral conducting device, passes only the negative pulse corresponding to the trailing edge of the multivibrator output pulse. As seen in curve e of FIG. 3, these pulses are delayed in time with respect to the occurrence of the peak of the cardio pulse 16 in curve a.

Finally, the signals are fed to another wave shaping circuit 20 which may be similar to circuit 14. As shown in curve f of FIG. 3 this results in a steep sided square topped pulse signal.

The output from circuit 20 is fed to one input of an "and" circuit 21 which will be described in more detail below.

Attention should now be directed to the pressure measuring equipment in FIG. 1 involving pressure cuff 22, inflating bulb 23, release valve 24 and pressure transducer 25. The pressure cuff 22 may be conventional, and for purpose of explanation conventional inflating means 23 and 24 are illustrated. As is well known, the cuff has an inflatable membrane which is wrapped around a limb of a patient and then inflated by means of the bulb 23 with the valve 24 closed. When the appropriate artery is occluded, inflation is stopped and valve 24 may be cracked open to permit slow deflation. It is to be understood that the inflation and deflation process may be performed automatically by suitable automatic equipment.

In order to measure the pressure prevailing in the cuff at any moment, the pressure circuit is coupled by a conduit 26 to the transducer 25. Although numerous devices are available for converting a pressure variation into an electrical signal, a typical arangement is shown in FIG. 2. The conduit 26 is coupled to the interior of an extensible bellows 27 which is coupled mechanically to a movable wiper 28 of an electrical potentiometer 29. If a source of D.C. voltage such as battery 30 is connected across potentiometer 29 then the voltage appearing at the wiper 28 with respect to ground, or any other fixed reference, can be made proportional to the cuff pressure. Thus, in FIG. 1, the connection 31 represents the output from the wiper of the potentiometer and can be connected to one axis, e.g., the Y-axis of a cathode ray tube or other display device 32.

Assuming for the moment that the output of the pressure transducer 25 is connected to the Y-axis of a cathode ray oscilloscope, then the vertical deflection of the spot on the screen of the cathode ray tube will be a function of cuff pressure and can be directly proportional thereto.

As the pressure in the cuff 22 is lowered a point will be reached when the ascultatory sounds associated with blood spurting through the artery will develop. These can be detected by a contact type microphone 33 located in the cuff or disposed on the limb of the patient adjacent the cuff away from the heart. A typical signal detected by the microphone 33 is represented by curve g in FIG. 3. As will be explained more fully below, it may be assumed that the pulse bursts 34 correspond to sounds generated by blood in the artery while the signal 35 represents an interfering or spurious signal due to any one of many extraneous causes.

It should be noted at this point that the microphone must not be hermetically sealed if it is to be located within the cuff and subjected to cuff pressure. Otherwise the external pressure will excessively strain the moving element and damage the microphone.

The output from the microphone 33 is fed through a 40-300 cycle bandpass filter 36 to remove the higher frequency components and smooth the signal as shown by curve h in FIG. 3. If necesasry, the signal may next be passed through an amplifier 37 and then to a wave shaping circuit 38. This may be a circuit similar to circuits 14 and 20. The output from the wave shaping circuit 38 will be as represented in curve i of FIG. 3. It will be apparent that the pulses 39 correspond to the major positive spikes of pulse bursts 34 while the pulse 40 corresponds to the major spike of the spurious signal 35.

It is now possible to consider the function of the "and" circuit 21. This circuit has the characteristic of remaining in one stable state or maintaining a fixed output level until signals of the requisite polarity are received simultaneously at both of its inputs. A signal on only one input will not cause the circuit to produce an output. In the present example, circuit 21 is arranged to produce a positive pulse (as shown in curve j of FIG. 3) whenever positive pulses are received simultaneously at its input. As seen in FIG. 1, the output of wave shaping circuit 38 will be fed to the second input of "and" circuit 21 through the switch 41 when the latter is closed.

Consideration of curve j of FIG. 3 will reveal that the spurious pulse 40 does not produce a pulse at the output of circuit 21. The can be understood by comparing curves f and i representing the inputs to the "and" circuit.

In the illustrative example it was assumed that the microphone supplied the spurious signal. However, the same discrimination will be provided if unwanted signals should appear in the circuit coupled to the electrodes 10, 11 and 12. Of course, it is assumed that a similar unwanted signal will not occur simultaneously in the microphone channel. Since the electrodes 10, 11 and 12 do not respond to the same disturbances as the microphone 33, it will be apparent that false coincidence is highly improbable if not impossible.

It should be understood that by suitable adjustment of the time delay introduced by the multivibrator 17 it is possible to compensate for the natural time lag between appearance of the heart muscle potentials 16 and detection of the auscultatory sound of spurting blood by the microphone 33. This lag will be apparent from a comparison of curves a and g of FIG. 3. It is believed that an adjustable time delay range of from 75 to 250 milliseconds should cover most situations.

In the system shown in FIG. 1, the output from the "and" circuit 21 is fed to the Z-axis input of the display device 32. As is well known, if the device 32 is a cathode ray oscilloscope, the pulses supplied to the Z-axis input can be arranged to turn on the beam during the occurrence of the pulse and to leave off the beam between pulses.

If it is assumed that the pressure in the cuff 22 is being slowly reduced and that some fixed voltage is applied to the X-axis input of a cathode ray oscillosocpe display device, then with the switch 41 closed a trace somewhat as shown by the dashed line 42 in FIG. 4 will appear on the screen of the tube. Each of the dashes traced by the beam of the tube represents a pulse from the circuit 21. Bearing in mind that the pulses from circuit 21 will occur only between the systolic and diastolic levels, it should now be apparent that the position of one end of the line 42, e.g., 43, will represent the systolic pressure and the other end, 44, will represent the diastolic pressure. The line can be inverted in well known manner if it is desired that the upper termination represent the diastolic pressure. By suitably calibrating the horizontal grid 45 it is possible to read the exact pressure values. In the example, the systolic pressure is 120 and the diastolic, 85.

To perform a typical measurement, the cuff pressure is raised with switch 41 open until a point above systolic is reached. Then switch 41 is closed and valve 24 opened slightly. The rest is automatic with the trace 42 appearing to provide a reading. If a permanent record is required, the cathode ray oscilloscope may be replaced by an X—Y recorder or other pen type recording device. It will be understood that the same form of trace or representation can be obtained from these electromechanical devices as can be obtained from the cathode ray device. If automatic equipment is employed to cycle the cuff pressure, then, in well known manner, the switch 41 can be automated.

So far, consideration has been given to a single reading. When it is desired to display or record a plurality of successive readings then an electrical step function generator 46 can be coupled to the X-axis input of the display device 32 in FIG. 1 so as to displace successive traces as shown at 47 and 48 in FIG. 4. The generator 46 can be synchronized in known manner with the cuff inflation system.

Although the apparatus as described with reference to FIG. 1 employs a display device for providing a visual manifestation of the pressure readings, it is contemplated that the sampled pressure signals can be fed as control or informational signals to any other equipment which requires blood pressure information for its operation.

Having described the invention with reference to a specific embodiment thereof it will be clear to those skilled in the art that numerous changes can be made in the equipment while retaining the true spirit of the invention as defined in the appended claims.

What is claimed is:

1. A sphygmomanometer comprising an inflatable cuff for encircling a portion of the human body, means for selectably inflating said cuff for occluding an arterial vessel, an electromechanical pressure transducer coupled to the pressure circuit of said cuff for producing an electrical signal as a function of cuff pressure, an electromechanical auscultatory transducer for monitoring the sounds of arterial flow past the cuff and producing an electrical signal responsive thereto, electrode means for detecting the electrical potentials associated with the contractions of the heart muscles, a comparison circuit coupled to both said electrode means and said auscultatory transducer for producing an output signal only when a signal from said auscultatory transducer occurs a predetermined interval after a signal from said electrode means, and indicating means coupled to both said pressure transducer and said comparison circuit for indicating the cuff pressure when a signal is produced by the comparison circuit.

2. A sphygmomanometer according to claim 1, wherein said auscultatory transducer comprises a contact type microphone.

3. A sphygmomanometer according to claim 1, wherein said comparison circuit comprises a pulse coincidence circuit, a pulse delay circuit coupling said electrode means to a first input of said coincidence circuit, means coupling said auscultatory transducer to a second input of said coincidence circuit, and means coupling an output of the coincidence circuit to said indicating means.

4. A sphygmomanometer according to claim 1, wherein said indicating means comprises a graphical display device having at least two independent axes inputs coupled respectively to said pressure transducer and said comparison circuit.

5. A sphygmomanometer according to claim 4, wherein said graphical display device comprises a cathode ray oscilloscope.

6. A sphygmomanometer according to claim 5, wherein said cathode ray oscilloscope has its Z-axis coupled to said comparison circuit and one of its X- and Y-axes coupled to said pressure transducer.

7. A sphygmomanometer according to claim 6, wherein means are provided for supplying a step voltage to the other of said X- and Y-axes in synchronism with successive pressure cycles through said cuff.

8. A device for measuring the systolic and diastolic blood pressures in a human body comprising an inflatable cuff for encircling a portion of the human body, means for selectably inflating said cuff for occluding an arterial vessel, an electromechanical auscultatory transducer for monitoring the sounds of arterial flow past the cuff and producing an electrical signal responsive thereto, electrode means for detecting the electrical potentials associated with the contractions of the heart muscles, a comparison circuit coupled to both said electrode means and said auscultatory transducer for producing an output signal only when a signal from said auscultatory transducer occurs a predetermined interval after a signal from said electrode means, and means coupled both to the pressure circuit of said cuff and to said comparison circuit for sampling the cuff pressure and producing a manifestation corresponding thereto in response to reception of said output signal from the comparison circuit.

9. A device for measuring the systolic and diastolic blood pressure in a human body comprising an inflatable cuff for encircling a portion of the human body, means for selectably inflating said cuff for occluding an arterial vessel, an electromechanical pressure transducer coupled to the pressure circuit of said cuff for producing an electrical signal as a function of cuff pressure, an electromechanical auscultatory transducer for monitoring the sounds of arterial flow past the cuff and producing an electrical signal responsive thereto, electrode means for detecting the electrical potentials associated with the contractions of the heart muscles, a comparison circuit coupled to both said electrode means and said auscultatory transducer for producing an output signal only when a signal from said auscultatory transducer occurs a predetermined interval after a signal from said electrode means, and means coupled both to said pressure transducer and to said comparison circuit for sampling the cuff pressure and producing a manifestation corresponding thereto in response to reception of said output signal from the comparison circuit.

References Cited in the file of this patent

UNITED STATES PATENTS

| | | |
|---|---|---|
| 2,756,741 | Campanella | July 31, 1956 |
| 2,827,040 | Gilford | Mar. 18, 1958 |
| 2,865,365 | Newland | Dec. 23, 1958 |
| 2,989,051 | Zuidema | June 20, 1961 |